(12) United States Patent
Asokan et al.

(10) Patent No.: US 7,529,929 B2
(45) Date of Patent: May 5, 2009

(54) SYSTEM AND METHOD FOR DYNAMICALLY ENFORCING DIGITAL RIGHTS MANAGEMENT RULES

(75) Inventors: Nadarajah Asokan, Espoo (FI); Jan-Erik Ekberg, Helsinki (FI); Jorma Stenman, Helsinki (FI); Jaakko Teinila, Espoo (FI)

(73) Assignee: Nokia Corporation, Espoo (FI)

( * ) Notice: Subject to any disclaimer, the term of this patent is extended or adjusted under 35 U.S.C. 154(b) by 982 days.

(21) Appl. No.: 10/161,082

(22) Filed: May 30, 2002

(65) Prior Publication Data

US 2003/0226012 A1   Dec. 4, 2003

(51) Int. Cl.
*H04L 9/00* (2006.01)
*H04L 29/00* (2006.01)
*H04L 29/08* (2006.01)
*H04L 29/12* (2006.01)

(52) U.S. Cl. .................. 713/161; 713/156; 713/189; 705/51; 705/52; 705/67; 380/227; 380/229; 380/277

(58) Field of Classification Search ................... None
See application file for complete search history.

(56) References Cited

U.S. PATENT DOCUMENTS

| | | | |
|---|---|---|---|
| 7,089,429 B2 * | 8/2006 | Gustafsson ................. 726/26 |
| 7,139,372 B2 * | 11/2006 | Chakravorty et al. ... 379/114.01 |
| 7,398,557 B2 * | 7/2008 | de Jong ...................... 726/29 |
| 2002/0049679 A1 * | 4/2002 | Russell et al. ................ 705/52 |
| 2002/0077985 A1 * | 6/2002 | Kobata et al. ................ 705/51 |
| 2002/0082997 A1 * | 6/2002 | Kobata et al. ................ 705/51 |
| 2002/0083200 A1 * | 6/2002 | Haulund et al. ............. 709/245 |
| 2002/0161996 A1 * | 10/2002 | Koved et al. ................ 713/150 |
| 2003/0140243 A1 * | 7/2003 | Nusser et al. ............... 713/200 |
| 2004/0054894 A1 * | 3/2004 | Lambert ..................... 713/165 |

OTHER PUBLICATIONS

"Digital Rights Management and Superdistribution of Mobile Content", copyrighted 2001.

* cited by examiner

*Primary Examiner*—Syed A. Zia
(74) *Attorney, Agent, or Firm*—Hollingsworth & Funk, LLC

(57) ABSTRACT

A system and method for enforcing digital rights management (DRM) rules in a terminal, even when the requesting rendering application is already operating. Content, which may be encrypted, is received at the terminal and securely stored. On-demand authorization is effected for the rendering application that is requesting access to the content, using secure communications between a DRM engine within the terminal and an operating system within the terminal that is augmented with a security manager adapted to engage in such secure communications. If the rendering application is found to be authorized, the DRM rules are applied to determine whether the rendering application may access the content, and if so, the content is made available to the rendering application.

34 Claims, 11 Drawing Sheets

SYSTEM AND METHOD FOR DYNAMICALLY ENFORCING DIGITAL RIGHTS MANAGEMENT RULES

FIELD OF THE INVENTION

This invention relates in general to the controlled communication of content between user terminals, and more particularly to a method and apparatus for dynamically enforcing digital rights management rules.

BACKGROUND OF THE INVENTION

New technologies are continually emerging, enabling new types of content to be delivered over mobile networks for use with mobile terminals. The success of Short Message Service (SMS) fueled further developments such as Enhanced Messaging Service (EMS), Multimedia Messaging Service (MMS), and other communications protocols which allow the transmission of more than merely textual content. These and other new technologies allow for a variety of different types of content to be communicated to and from mobile (and landline) devices, including ringing tones, icons, Java games, video clips, software tools, etc.

For the delivery of digital content to be beneficial for all parties concerned, solid methods for managing the use of the content needs to be in place. To ensure business profitability, content providers' copyrights need to be protected to provide an incentive for such providers to continue developing and publishing digital content. Content retailers include, for example, operator portals, various media companies, entrepreneurs. On the other hand, convenience in finding, using, and paying for the digital content is of great importance to the terminal users.

The natural tendency for peer-to-peer sharing of messages, jokes, etc. is evidenced by the popularity and success of SMS. Great content will spread like good rumor, and content that people might otherwise never come across suddenly gets shared among communities of people with similar interests. One aspect of the present invention involves exploiting this phenomenon by facilitating the transfer of content to and from mobile terminals, and between mobile terminals, while restricting the mobile users' ability to fully use/control the content unless authorized to do so (e.g., by purchasing the content). Where content is transferred from user to user between wireless (and/or landline) terminals, this concept is referred to herein as superdistribution. With superdistribution, the content consumers themselves become the advertisers and distributors of the content. However, superdistribution represents a risk in terms of protecting against illegal copying. The future service architecture must ensure that whenever content is consumed in such a fashion, the authors and distributors of the content can be properly paid. This is vital to avoid losing revenue through content "pirating."

One manner of protecting the content in such a superdistribution environment is to make such content available only on special-purpose client devices. For example, a special wireless device can be specially designed and adapted to transfer content to/from other similar special wireless devices, and the devices themselves can be designed to securely communicate with one another and ensure proper payment. Where protected content can be used only on such special-purpose client devices, enforcing DRM rules is relatively straightforward.

However, the consuming public is not, for the most part, looking to increase the number of wireless devices that must be carried with them. Rather, what is appealing to terminal users is the ability to do more with their existing general-purpose devices, such as personal communicators (e.g., wireless telephone), personal digital assistants (PDA), etc. Thus, the use of special purpose devices will not be very effective in the proliferation of the content, as most people want to use their general purpose devices to play protected content rather than a special purpose device.

General purpose device operating systems are not configured to handle this type of content transfer, and thus the enforcement of DRM rules in general-purpose device environments is not currently available. Further, it is desirable that the operating systems associated with general purpose devices require relatively few modifications, in order to minimize further operating system complexity and to allow multiple operating systems to be adapted appropriately.

Accordingly, there is a need in the communications industry for a system and method for augmenting operating systems operable in general purpose terminals to allow for the transfer of content while enforcing DRM rules. A further need exists for a system and methodology that allows such DRM rule enforcement during the rendering of content on the general purpose terminals. The present invention fulfills these and other needs, and offers other advantages over the prior art.

SUMMARY OF THE INVENTION

To overcome limitations in the prior art, and to overcome other limitations that will become apparent upon reading and understanding the present specification, the present invention discloses a system, apparatus and method for enforcing digital rights management (DRM) rules in a terminal while rendering content.

In accordance with one embodiment of the invention, a method is provided for enforcing digital rights management (DRM) rules at a terminal. The method includes receiving content and at least one voucher identifying the DRM rules at the terminal. The method further includes providing on-demand authorization of an operating terminal application that is seeking access to the content, where such authorization is effected via secure communications between a DRM engine and an operating system that is augmented with a security manager adapted to conduct the secure communications. The security manager provides relevant information about the terminal application to the DRM engine. Once the terminal application is suitably authenticated, the DRM rules are applied to determine whether the terminal application may access the content. If the application is allowed access to the content as dictated by the DRM rules, the terminal application accesses the content.

In accordance with another embodiment of the invention, a terminal is provided that is capable of receiving content and at least one corresponding voucher including usage rights for the content. The terminal may be a wireless terminal such as a mobile telephone, personal digital assistant, or other wireless device, or may also be a landline client device such as a desktop computer operating in a server environment. A rendering application operable on the terminal provides a content request, and presents the content upon access authorization. A digital rights management (DRM) engine is coupled to receive the content request, and to invoke a request to authenticate the rendering application in response to the content request. The request to authenticate the rendering application includes at least an identifier of an inter-process communication (IPC) connection opened in response to the content request. An operating system augmented with a security manager is configured to receive the request to authenticate the rendering application and the IPC connection identifier, and in response provides data uniquely associated with a process identified by the IPC connection. The DRM engine then receives the data and verifies a certificate of the rendering application using the data, and if the rendering application is successfully verified, the rendering application is allowed access to the content as dictated by the usage rights.

In accordance with another embodiment of the invention, a method is provided for enforcing DRM rules at a terminal when a rendering application operable within the terminal is already operating. Access to content securely stored in the terminal is requested, and such a request may be made by the rendering application or by a security manager which forms part of the operating system. A DRM engine makes a request for at least a portion of program text of a process identified by an inter-process communication (IPC) connection opened in response to the request for content. The request for the program text is received by the security manager, and the process corresponding to the IPC connection is identified by the security manager. The program text is provided to the DRM engine from the security manager. The DRM engine then verifies whether the rendering application is authorized to access the program text of the process, where the program text of the process and a certificate of the rendering application are used for the verification. An access control decision is made by the DRM engine if the rendering application is authorized to access the program text of the process. The content is made accessible to the rendering application if the access control decision is positive.

In accordance with another embodiment of the invention, a content distribution system is provided. The system includes a content sending terminal to dispatch content and an associated voucher that includes recipient usage rights, and further includes a content receiving terminal coupled to receive the content and the associated voucher. The content receiving terminal includes a rendering application to provide a content request and to present the content upon access authorization. The content receiving terminal also includes a digital rights management (DRM) engine coupled to receive the content request and to invoke a request to authenticate the rendering application in response to the content request. The request to authenticate the rendering application includes at least an identifier of an inter-process communication (IPC) connection opened in response to the content request. The content receiving terminal also includes an operating system augmented with a security manager configured to receive the request to authenticate the rendering application and the IPC connection identifier, and in response provides data uniquely associated with a process identified by the IPC connection. The DRM engine further receives the data and verifies a certificate of the rendering application using the data, and if the rendering application is successfully verified, the rendering application is allowed access to the content as dictated by the recipient usage rights.

In accordance with still another embodiment of the invention, a method is provided for distributing content for use on a plurality of terminals. The method includes issuing a transfer request from a receiving terminal to a sending terminal having distributable content. A device certificate of the receiving terminal is verified by the sending terminal to determine whether the receiving terminal is compliant. A voucher including recipient usage rights is created at the sending terminal, and the content and voucher are transferred to the receiving terminal if the receiving terminal is verified as compliant. The receiving terminal provides on-demand authorization of an operating terminal application which is seeking access to the content, via secure communications between a DRM engine and an operating system augmented with a security manager adapted to conduct the secure communications. If the terminal application is authorized, recipient usage rights are applied at the receiving terminal to determine whether the terminal application may access the content. If access is allowed in response to applying the recipient usage rights, the terminal application is allowed access to the content.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The invention is described in connection with the embodiments illustrated in the following diagrams.

DETAILED DESCRIPTION OF THE INVENTION

Figure 1:
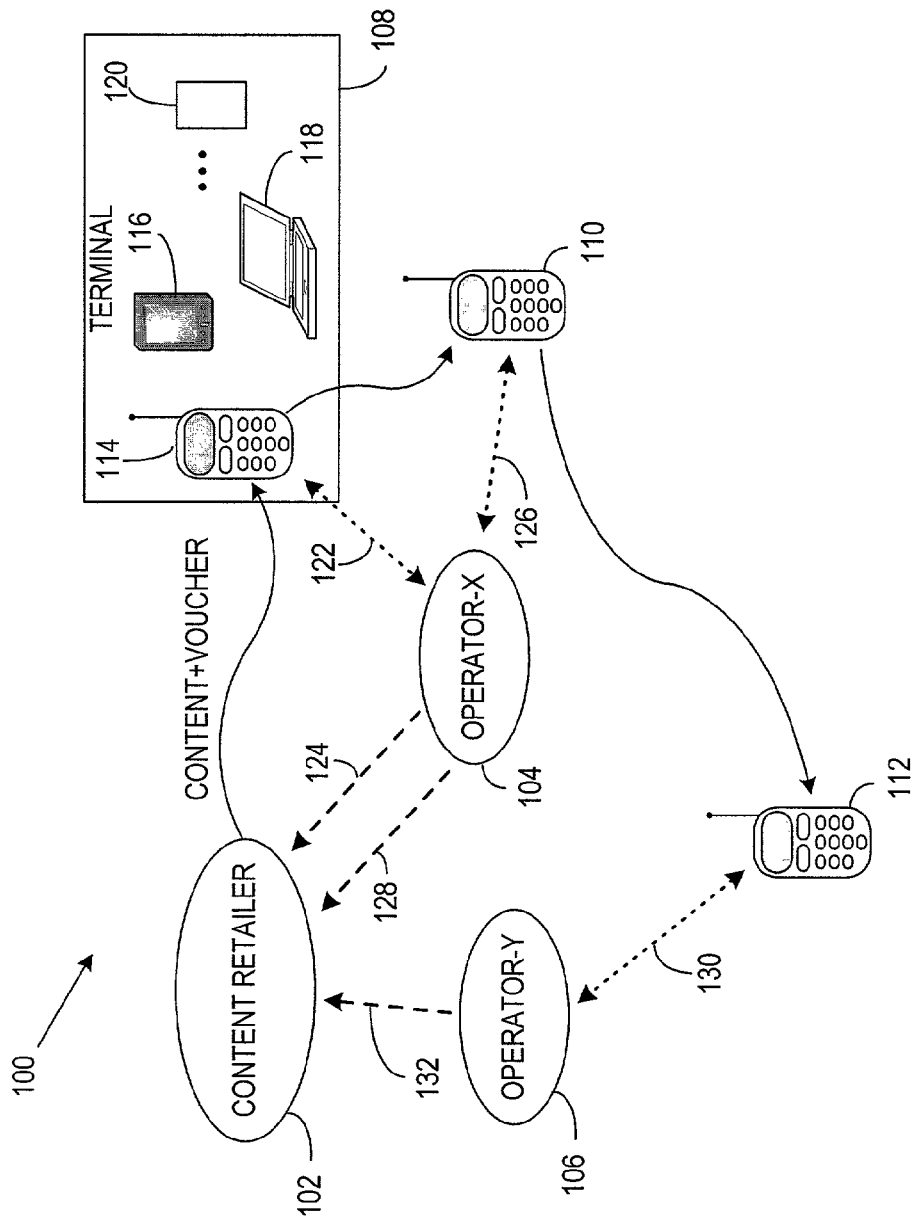
FIG. 1 illustrates a representative content delivery environment including both direct content distribution and peer-to-peer content distribution in accordance with the present invention.

In the following description of the exemplary embodiment, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

Generally, the present invention provides a system and method for enforcing digital rights management (DRM) rules in a terminal while rendering content. Content is received at the terminal, such as a wireless communicator or other wireless or landline device. In one embodiment of the invention, the content is encrypted and securely stored within the terminal. On-demand authorization is effected for the terminal rendering application that is requesting access to the content. This authorization is accomplished using secure communications between a DRM engine within the terminal and an operating system within the terminal that is augmented with a security manager adapted to engage in such secure communications. When the rendering application is authenticated by the security manager, the DRM rules are applied to determine whether the rendering application may access the content. If so, the content is made available to the rendering application.

The dynamic authorization of content in accordance with the present invention is beneficial in a variety of contexts. One such context is in the content retailing industry, where unlawful transfers of content without the requisite payment can greatly impact the success of content retailers, developers, and authors. On the other hand, it is desirable to provide users some latitude in transferring content to each other, as the content can be widely disseminated through user-to-user transfers. The present invention provides a manner of securing content and regulating the use of content transferred to a mobile device, thereby allowing the desired dissemination while ensuring proper payment. In order to facilitate an understanding of the invention, a representative transaction environment in which the principles of the present invention are particularly useful is set forth below.

Content retailers include operator portals, various media companies and entrepreneurs. Payment collectors complement the content retailer's business by offering a platform for collecting payments. For example, mobile operators may serve as the payment collector, offering its billing platform for multiple content retailers. Other examples include external server-based payment systems that offer payment channels, e.g. for credit cards and debit cards, or terminal-based payment applications in which case there is no need for operator billing system in the payment process. Regardless of the payment methodology employed, the future service architecture must ensure that whenever content is consumed, the payment gets collected. This is vital to avoid losing revenue and to stave off the long-term effect of bad consumer habits resulting from "pirate use."

Addressing unauthorized content delivery and/or receipt often involves delivery control methodologies, which controls the manner in which content can be delivered or transferred. An alternate control mechanism to delivery control is usage control. In accordance with the present invention, usage rights are expressed in mobile rights vouchers, created and optionally distributed separately from the content objects. The payment is collected against the issued vouchers, where the control point lies in the mobile device middleware as described more fully below. In accordance with one embodiment of the invention, the mobile client requires both the content object and referring rights voucher to be present before executing or storing the media.

The evolution from delivery control to usage control presents a new dimension to multichannel service discovery. The content may be discovered and purchased in several different ways, e.g., from viewing an ad in a magazine, or through a friend who may possess the content on his/her mobile device. The separation of the content object and rights voucher enables a friend to send content, such as ringing tones, icons, music, etc. to another mobile terminal using, for example, Multimedia Messaging Service (MMS) or other multimedia distribution methodology. Such peer-to-peer distribution facilitates advertising-free content distribution to people having similar interests, resulting in the consumers themselves becoming distributors. This concept is referred to herein as superdistribution. However, superdistribution presents a risk in terms of illegal copying of content. Any copy protection system is vulnerable to attacks and it is possible that an item of content may be cracked and distributed freely. Using personalized vouchers and encrypted content in accordance with the present invention will mitigate such damage, since each content object must be individually "hacked" for each terminal.

FIG. 1 illustrates a representative content delivery environment 100 including both direct content distribution and peer-to-peer content distribution. Some key components in mobile Digital Rights Management (DRM) can be described in connection with FIG. 1. A voucher server (VS) may be hosted by a content retailer 102, or an operator 104, 106 in the role of a content retailer. The VS registers the content to the mobile DRM system associated with mobile terminals 108, 110, 112, and issues vouchers. A content server (CS) which includes the downloadable content is hosted by the content retailer 102 or its content partners if it operates in aggregation mode. A DRM broker is hosted by the payment collector, which in the illustrated embodiment is an operator 104, 106. The broker is effectively a "rights-clearing feature" in the mobile payment solution with interfaces to payment systems. In this example, the content retailer 102 (the VS and CS owner in this example) makes a payment and rights clearing agreement with the operator 104, 106 (the DRM Broker in this example), agreeing to pay a certain percentage or amount on each transaction cleared. The content retailer's VS keeps track of all the unique content it puts into circulation.

The CS owner registers each content object that it wants to import into the mobile DRM systems of the mobile terminals 108, 110, 112. Content registration involves the CS shipping the content object to the VS, which creates a unique content identifier (ID) and packages the content into a DRM-specific content package. Furthermore, the CS tells the VS what kind of usage rules can be issued for the content. The browsing and downloading of registered content takes place directly between the CS and the consumer, regardless of the voucher purchase process. Once downloaded, the registered content may flow freely from terminal to terminal.

When the user attempts to utilize registered content, the terminal 108, 110, 112 will check whether there is a voucher with a referring content ID in the terminal. If there is not such a voucher, the terminal will initiate a payment and rights clearing process with a payment service provider. The voucher purchase is carried out through the DRM Broker, based on the VS address. Once the consumer agrees to pay, the DRM Broker clears the payment and asks for a voucher from the VS. The rights clearing process is completed as the DRM Broker forwards the voucher generated by the VS to the user.

In a more particular example of content transactions, the content retailer 102 issues the content plus usage rights, expressed in vouchers, to a wireless terminal 108. The wireless terminal 108 may represent any of a number of mobile communication devices, such as a cellular telephone 114, a personal digital assistant (PDA) 116, a notebook or laptop computer 118, or any other type of wireless terminal represented by device 120. The voucher is enforced at the terminal 108 (e.g., wireless telephone 114) in a manner described in greater detail below. Operator-X 104 collects the payment and optionally provides a portion of the payment back to the content retailer 102 as represented by lines 122 and 124 respectively. This transaction represents a direct content transaction from the content retailer 102 to the terminal 108.

In a peer-to-peer transaction, the content and a voucher can be transferred from terminal 108 to another terminal, such as wireless telephone 110. Again, the voucher is enforced at the receiving terminal 110, and the operator-X 104 collects the payment and provides at least a portion of the payment back to the content retailer 102 as represented by lines 126 and 128 respectively. This transaction represents a peer-to-peer content transaction from wireless terminal 108 to wireless terminal 110. This distribution process can continue, such as by terminal 110 transferring the content and a voucher to terminal 112, which in turn enforces the voucher, and makes payment with operator-Y 106 as represented via line 130. Operator-Y 106 thereafter provides at least a portion of the payment back to the content retailer 102 as represented by line 132. The use of the voucher and its local enforcement at the DRM system of each recipient terminal facilitates the secure, peer-to-peer distribution of content.

An example of a specific peer-to-peer content transfer is now described. A user of a wireless communicator, such as a mobile telephone, is at a railway station and notices an advertisement for a wireless kiosk selling a new hit song. The user takes out his wireless communicator, and sees that the wireless kiosk is visible in his browser. With a few clicks, he pays for a copy of the song, and downloads a corresponding MP3 file to his communicator. After boarding the train, he (user-1) meets a fellow traveler (user-2) and discovers that she is a music fan. User-1 transfers a copy of the new song to user-2's compliant wireless communicator, along with a voucher embodying user rights including "preview" rights to the song which allows user-2 to listen to the song a predetermined number of times without paying for it. After that, user-2 must commit to pay for the song if she wants the continued ability to listen to it. Assuming she decides to purchase the song, user-2 commits to pay for the song via her mobile communicator, and obtains further rights to listen to the song. Upon exiting the train, user-2 notices another public kiosk where she then pays for the song that she earlier committed to purchase. In this example, both kiosk-user and peer-to-peer content transfers were effected, along with the appropriate vouchers to provide either preview or fill access rights. Advantageously, the vouchers ensured that the kiosk owners, as well as content owners and/or authors, received the payment for the sale of the content. This represents just one representative example of the multitude of distribution possibilities available through the implementation of vouchers and DRM management principles in accordance with the present invention.

For purposes of the transfer of content using vouchers in accordance with the invention, a compliant device is one that behaves according to the particular DRM specifications. Compliant devices will have, for example, an encryption key pair and a digital signature key pair for suitable asymmetric cryptographic schemes. Each device will also have, for example, a device certificate issued by the device manufacturer. The device certificate certifies the public keys of the device as belonging to a compliant device. Each device will also have, for example, the public signature verification key of the device manufacturer so that it can verify device certificates of other devices.

A piece of content may be associated with multiple types of rights, such as transfer rights and usage rights. Transfer rights specify policies for creating new rights for another device, and may include rights such as "give" or "copy" rights. Usage rights specify policies governing the local use of content. Rights for a piece of content are embodied in a voucher. Each piece of content may be encrypted with a content key (e.g., symmetric key). The voucher contains the content key encrypted using, for example, the public key of the target device. It also contains policies specifying how this copy of the content is to be used. Compliant devices will obey the policy restrictions specified in a voucher. When a right is transferred, the sending device creates a voucher targeted for the receiving device. A sending device verifies that the receiving device is a compliant device before creating a voucher for it. A receiving device will accept a voucher if it can verify its correctness.

A voucher being transferred may contain, among other things, a description of the content and a description of the "rights" associated therewith. The voucher may also include a content encryption key encrypted using, for example, the public encryption key of the receiver. Sequence numbers used to ensure freshness may also be provided in a voucher, as well as a message authentication code (MAC) on other fields, using the content encryption key. In one embodiment, when a compliant receiving device is asked to import a voucher, it verifies the validity of the voucher by extracting the content encryption key, and then checking the MAC. Using such mechanisms ensures that only compliant devices be allowed to acquire and redistribute rights.

Verifying compliance alone may not be enough for a sender to make an access control decision about a receiver. For example, in the case of a sale, the sender may ask the receiver to securely bind his/her device certificate to a payment transaction (e.g., open a secure channel, and send credit card number and device certificate through the same channel). To enable such access control decisions, other authorization certificates may be used. For example, a user may issue certificates to each of his/her devices so that they can recognize each other. A device can then automatically approve a "give" transfer if the request came from another device belonging to the same user. With respect to the distribution of rights through copying, the creation of a new right for a piece of content is metered and reported so that the resulting revenue can be effectively collected and shared.

When the protocol engine (described more fully below) asks its compliant device to create a new right by copying, it can indicate whether it should be sender-reported or receiver-reported. In the former case, the compliant device records it locally as an unreported transaction. In the latter case, it may issue a voucher which is marked as report-pending. A special case of the receiver-reported voucher are preview vouchers, which come with a specified number of free previews. By default, these vouchers need not be reported, and will disappear once the free previews are used, But the user can convert it into an actual receiver-reported voucher in various ways, such as by committing to report it. Such a voucher can then be marked as report-pending. If proof of reporting is imported into the device, the report-pending voucher may then be converted to an unconstrained voucher. When the number of report-pending vouchers reach a specified limit, the device may be disabled in some fashion. In other words, it is the compliant devices that enforce policies on rights. Unconstrained and preview vouchers can be deleted by the user. If the user deletes a report-pending voucher, it may be marked as locked, and will be removed in actuality only after it has been reported.

By applying these types of reporting feature policies, the copyright owner(s) will be able to receive payment from the owner of the device that reports the transactions. In general, this implies that sender-reported transactions will typically be of the "pay now" type, where the transfer is accompanied by a payment from the receiver to the sender (using whatever payment mechanism is suitable, including free as a gift). Receiver-reported transactions are typically of the "pay later"

type, because the receiver should eventually pay the copyright owner. In any case, any payment scheme can be used for value transfer.

Figure 2:
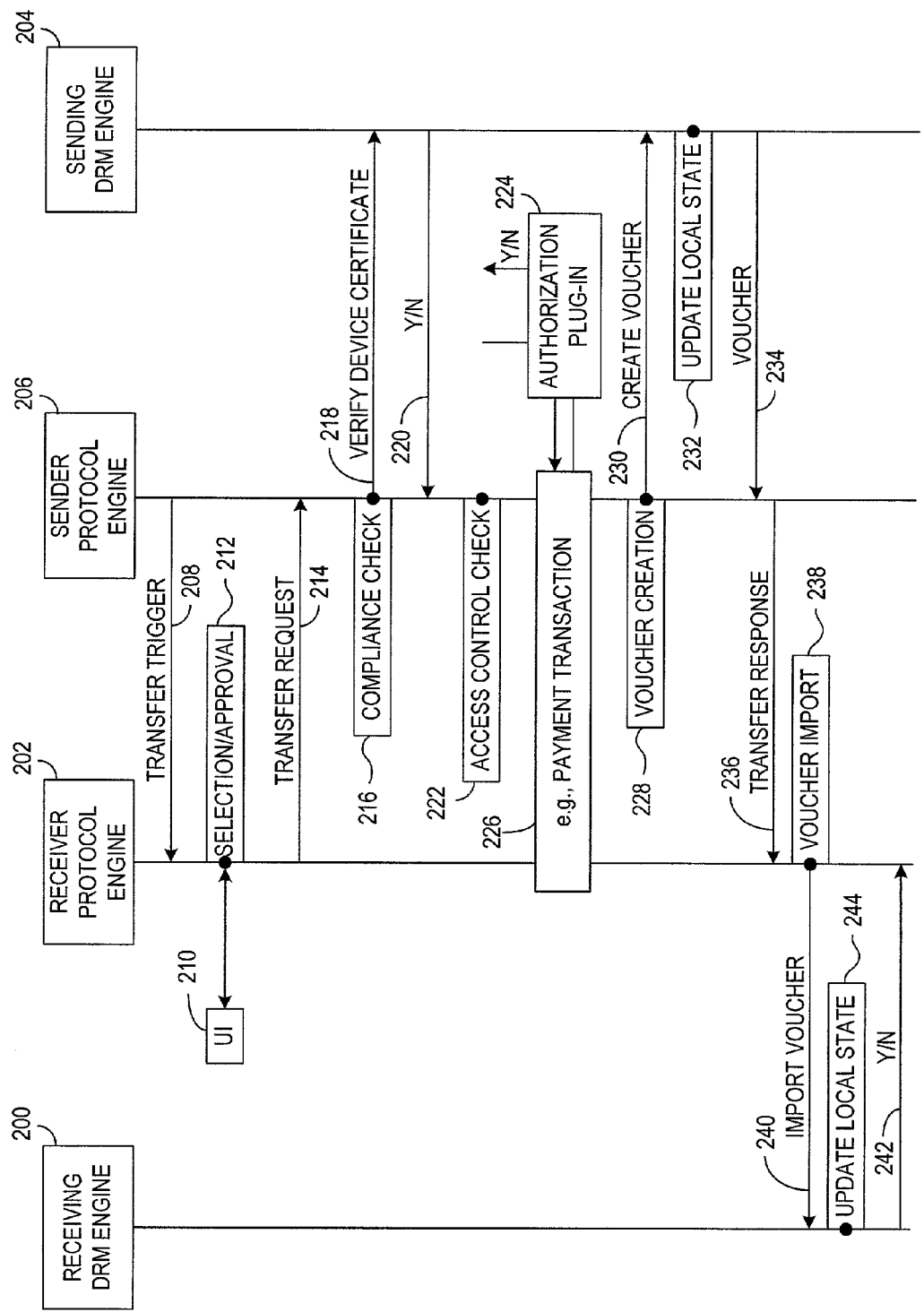
FIG. 2 illustrates a representative rights transfer protocol between user nodes, whereby a voucher embodying usage rights for requested content can be provided to the requesting user terminal.

To further illustrate a content transfer transaction, FIG. 2 illustrates a representative rights transfer protocol between user nodes, whereby a voucher embodying usage rights for requested content can be provided to the requesting user terminal. As will be described in greater detail in subsequent sections of this description, these vouchers are processed at the user terminal in accordance with the present invention.

The example illustrated in FIG. 2 includes a receiving DRM device 200 having an associated receiver protocol engine 202, and a sending DRM device 204 having an associated sender protocol engine 206. The sending device 204 is the device sending a right and/or the encrypted content. The receiving device 200 is the other device participating in the protocol, and is the recipient of the transferred usage right. The receiving device 200 may belong to the user associated with the receiver protocol engine 202, but this is not required as the protocols may be used to purchase a right on behalf of another person's device.

To initiate a transfer, a transfer trigger as shown on line 208 may optionally be sent by the sender. This message includes information such as a proposed transaction type (e.g., copy), policy information (e.g., price requested) that can be displayed to the receiver user, description of the content, and a description of the proposed voucher. It may also explicitly list the acceptable authorization options (e.g., payment methods). In another embodiment of the invention, the transfer is initiated by the receiving party, such as via a user interface (UI) 210. In this manner, the user of the receiving device selects/approves 212 the initiation of the transfer, depending on whether the sending or receiving device initiates the transfer.

A transfer request is sent by the receiver as shown on line 214, via the receiver protocol engine 202. Among other things, the transfer request includes a compliance certificate for the receiving device, and a sequence number to be used by the receiving device to guard against the replaying of old vouchers. On receiving the transfer request, the sender may first check whether the device certificate is acceptable to the sending DRM device 204. This may be performed via the compliance check function 216 which provides the device certificate to the sending device 204 for verification as illustrated on line 218, and providing a result of such verification as shown on line 220.

The sender protocol engine 206 may then perform an access control check 222 via an access control plug-in 224 (e.g., a payment plug-in 226 where the receiving device ID and payment is bound). In one embodiment, this access control check is orthogonal to the rights transfer system. The sender then requests that the sending DRM device 204 create a voucher, as illustrated by the voucher creation function 228 and the resulting create voucher request shown on line 230. In one embodiment, the sending DRM device 204 will create a voucher only if the receiving DRM device 200 has an acceptable compliance certificate, and if so, the voucher is created as illustrated on line 234. Creation of a voucher may change state information maintained by the sending DRM device 204, as illustrated by the update local state function 232.

The transfer response shown on line 236 includes the newly created voucher. The receiver may receive the encrypted content along with this response, or may receive the encrypted content separately. To use the voucher, it is imported into the receiving device, as illustrated by the voucher import function 238, which allows the voucher to be imported into the receiving DRM device 200 as illustrated on line 240. The receiving DRM device 200 checks whether the voucher is acceptable in accordance with the present invention, as described in greater detail below. For example, the receiving DRM device 200 may check whether the sequence number (RSEQ) is an acceptable sequence number, and the result of such a verification is provided back to the receiver protocol engine 202 as illustrated on line 242. If the receiving DRM device 200 was not consulted before sending the transfer request 214, a special sequence number value may be used. In any case, the state information maintained by the receiving DRM device 200 may change, as illustrated by the update local state function 244.

As previously indicated, vouchers are enforced at the user terminal or "node" that receives the voucher(s). In accordance with the present invention, local DRM enforcement is facilitated by implementing changes to the general purpose operating system platform to support the local, dynamic authentication using vouchers. Thus, it is the compliant DRM device that enforces the management of usage rights. Rather than create a "special purpose" device, the present invention exploits the general purpose operating system platforms used widely on a variety of available user terminals to be adapted as a DRM device. The present invention provides for authenticating processes at device run-time when needed. In accordance with one embodiment of the invention, the user is not allowed to make further modifications to the OS kernel in order to ensure that the OS can be loaded/started in a secure and reliable manner, and to ensure that integrity is maintained. Further restrictions on what the relative operating systems can access and how critical data is secured ensures that the OS kernel can obtain unique access to the secure data. In this manner, the OS kernel can formulate secure information (i.e., a "secret") by which secure storage for vouchers can be implemented, and to protect the private key of the device when stored. The OS kernel can also authenticate a process claiming to be the DRM engine. These and other functions associated with the modified operating system platform in accordance with the present invention provide for the local enforcement of DRM rules in connection with the rendering of content.

Figure 3:
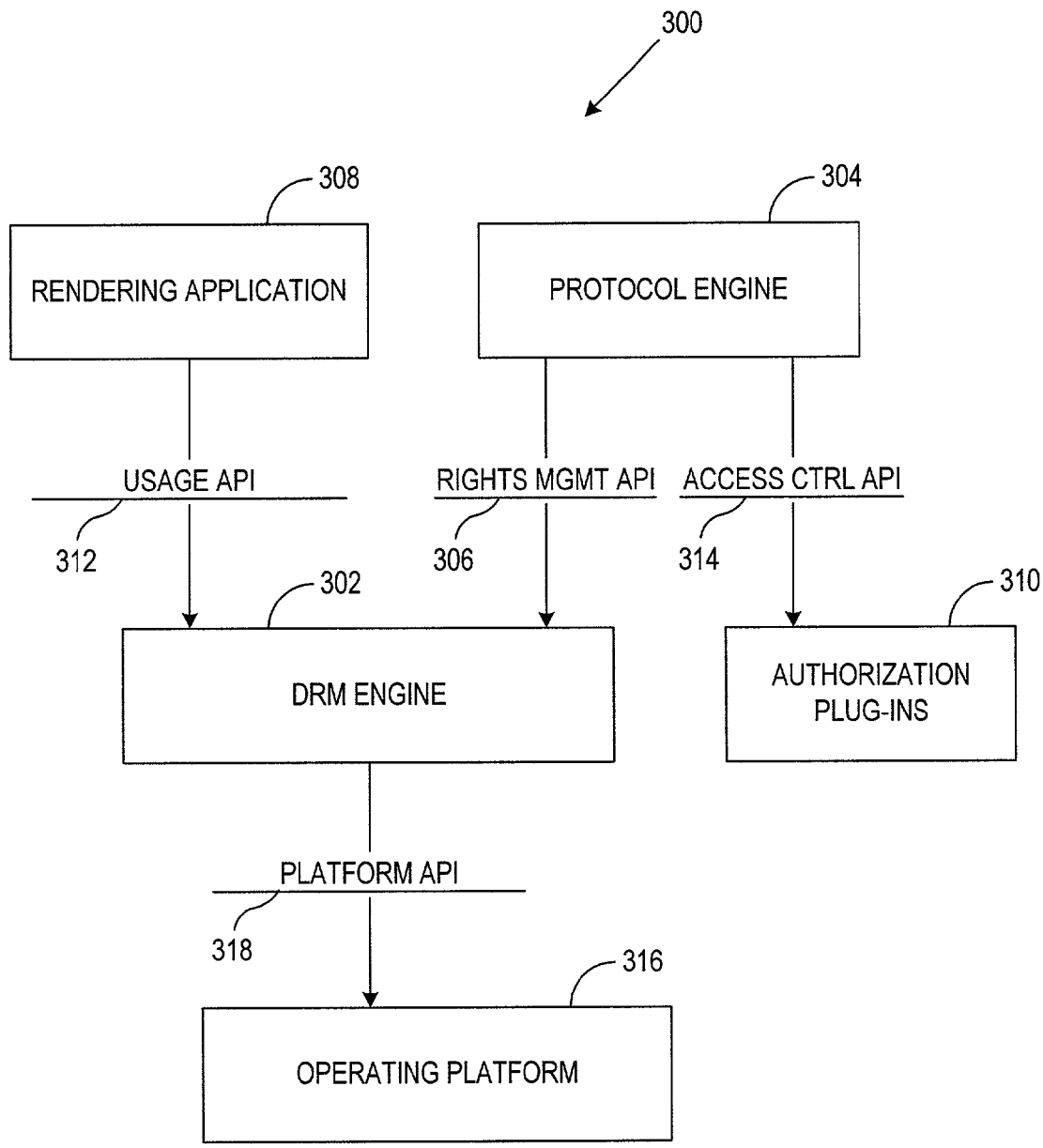
FIG. 3 is a block diagram of an exemplary conceptual architecture of a user terminal/node in accordance with one embodiment of the present invention.

FIG. 3 is a block diagram of an exemplary conceptual architecture of a user terminal/node 300 in accordance with one embodiment of the present invention. Each compliant user node includes a DRM engine 302, which may be implemented in hardware, hardware/firmware, software, or some combination thereof. In one embodiment, the DRM engine 302 is implemented in a tamper-resistant hardware module. The node 300 further includes a protocol engine 304 to implement the protocols and provide a user interface for the user. The protocol engine 304 and the DRM engine 302 communicate via a rights management application programming interface (API) 306. In one embodiment, the DRM engine 302 and the protocol engine 304 are implemented separately, as the node 300 is responsible for protecting the interests of not only the owner, but also of other parties such as authors and publishers of content. It is desirable that this "protection" portion of the node 300 be certifiable, and therefore in one embodiment of the invention it is useful to identify the minimal certifiable functionality as a separate part, namely, the DRM engine 302. This separation also allows the DRM device 302 to be used with different protocol engines and implementing the protocols over different transports.

In addition, there may be additional elements such as a rendering application(s) 308 which receives content from the DRM device and renders it, and one or more authorization plug-ins 310, such as for a payment system. The rendering application 308 and the DRM engine 302 communicate via a usage API 312, and the protocol engine 304 and the authorization plug-ins 310 communicate via an access control API 314.

In accordance with the present invention, the implementation of DRM functionality includes obtaining support from the underlying operating platform 316. This functionality is defined, for example, by the platform API 318. As will be described in greater detail below, the present invention provides for dynamic verification of usage rights at a node while requiring only minimal modifications to the general purpose operating system kernel.

Figure 4:
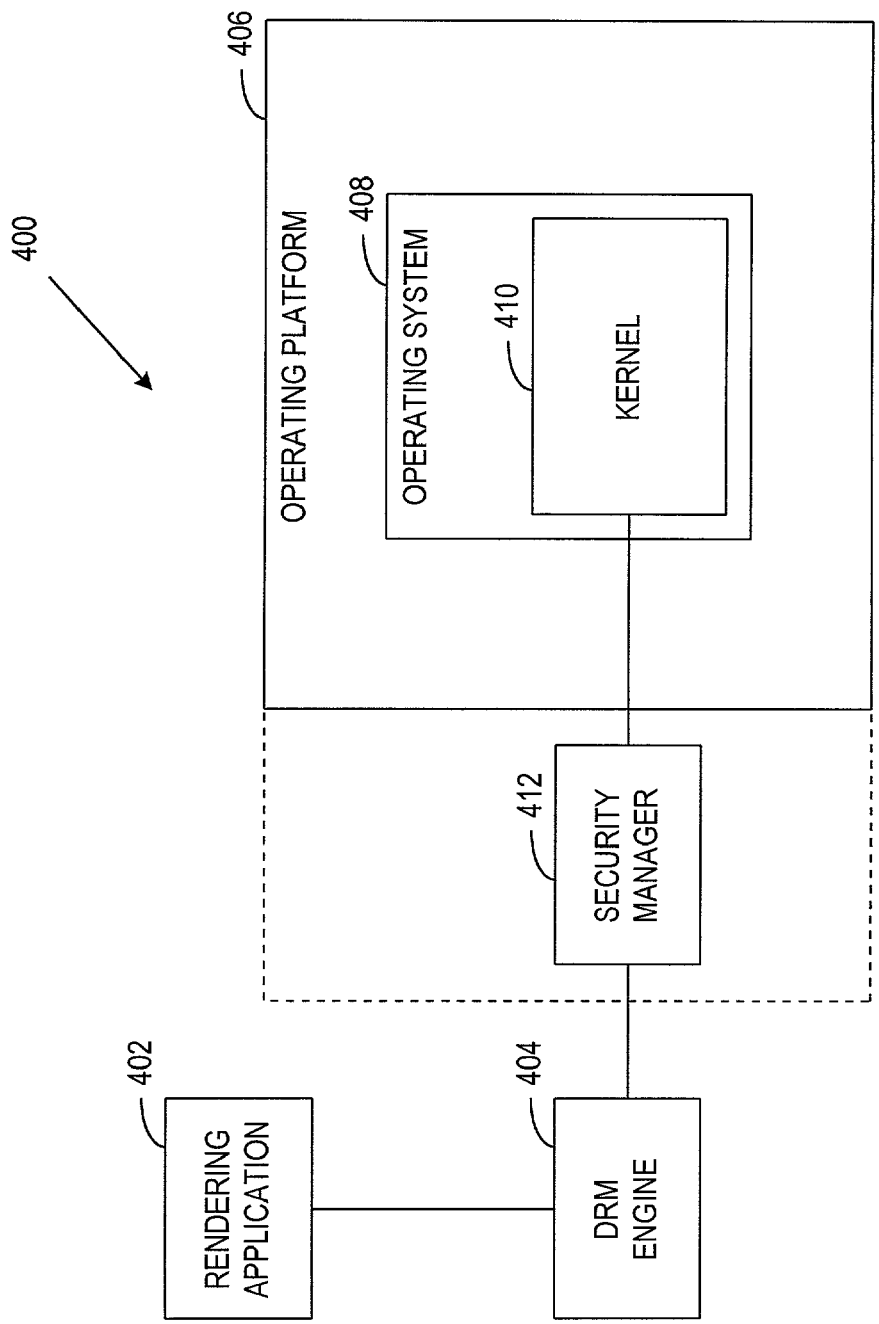
FIG. 4 is a block diagram of an exemplary DRM system in accordance with the principles of the present invention.

FIG. 4 is a block diagram of an exemplary DRM system 400 in accordance with the principles of the present invention. The DRM system 400 includes at least one rendering application 402, a DRM engine 404, and an operating platform 406. The operating platform 406 includes hardware and a general purpose operating system (OS) which includes the OS kernel 410. The present invention provides the support necessary from the operating environment such that no component at the terminal/node other than the DRM engine 404 will have controlling access to plaintext (i.e., decrypted) content, and such that the DRM engine 404 can verify the legitimacy of the rendering application(s) 402 and provide plaintext content to the rendering application 402 in a secure manner. In accordance with one embodiment of the invention, this is accomplished by augmenting the operating environment 406 with a security manager 412 which provides functionality described by/via an API. In one embodiment of the invention, this functionality includes private storage versions of file system functions, such as open( ), read( ), write( ), etc. such that only the application that created an object can read or write to the object. In one embodiment, this functionality also includes a function, such as a getText(pid, IPCId), a getHash(hash ID, pid, IPCId), etc. that identify the process that is communicating with the calling process via an inter-process communication (IPC) instance "IPCId", for example, and returns the information necessary to securely and uniquely identify this process. For example, in one embodiment, the getText(pid, IPCId) function identifies the process that is communicating with the calling process via an IPC instance IPCId, and returns the program text of this process. As another example, the gethash(hash ID, pid, IPCId) function identifies a hash ID and the process that is communicating with the calling process via an IPC instance IPCId, and returns the hash of the program text of this process. Other embodiments may be implemented in accordance with the present invention, some of which are described more fully below.

Each legitimate rendering application 402 has a certificate issued by an appropriate authority. The certificate certifies the code of the rendering application 402 as compliant. The DRM engine 404 includes the public keys to verify this certificate. In one embodiment, the verification will start from the device manufacturer's public signature verification key (also referred to as the "root key"). The DRM engine 404 could first verify the certificate of a rendering application 402 and then launch it as a process, which allows the DRM engine 404 to verify the legitimacy of the rendering application and provide it with plaintext content in a secure manner. However, there may be situations where the rendering application 402 is already running and it may not be acceptable to initiate another instance or to reinitiate the running application. Further, the DRM engine 404 may not be aware of the appropriate manner in which the rendering application 402 is to be initiated, such as by not being aware of the appropriate initiation options, etc. The security manager 412 API can be used by the DRM engine 404 to enforce DRM rules even when the rendering application 402 is already running. Thus, the present invention provides a manner of enforcing DRM rules while rendering content, while requiring minimal support from the OS platform.

Figure 5:
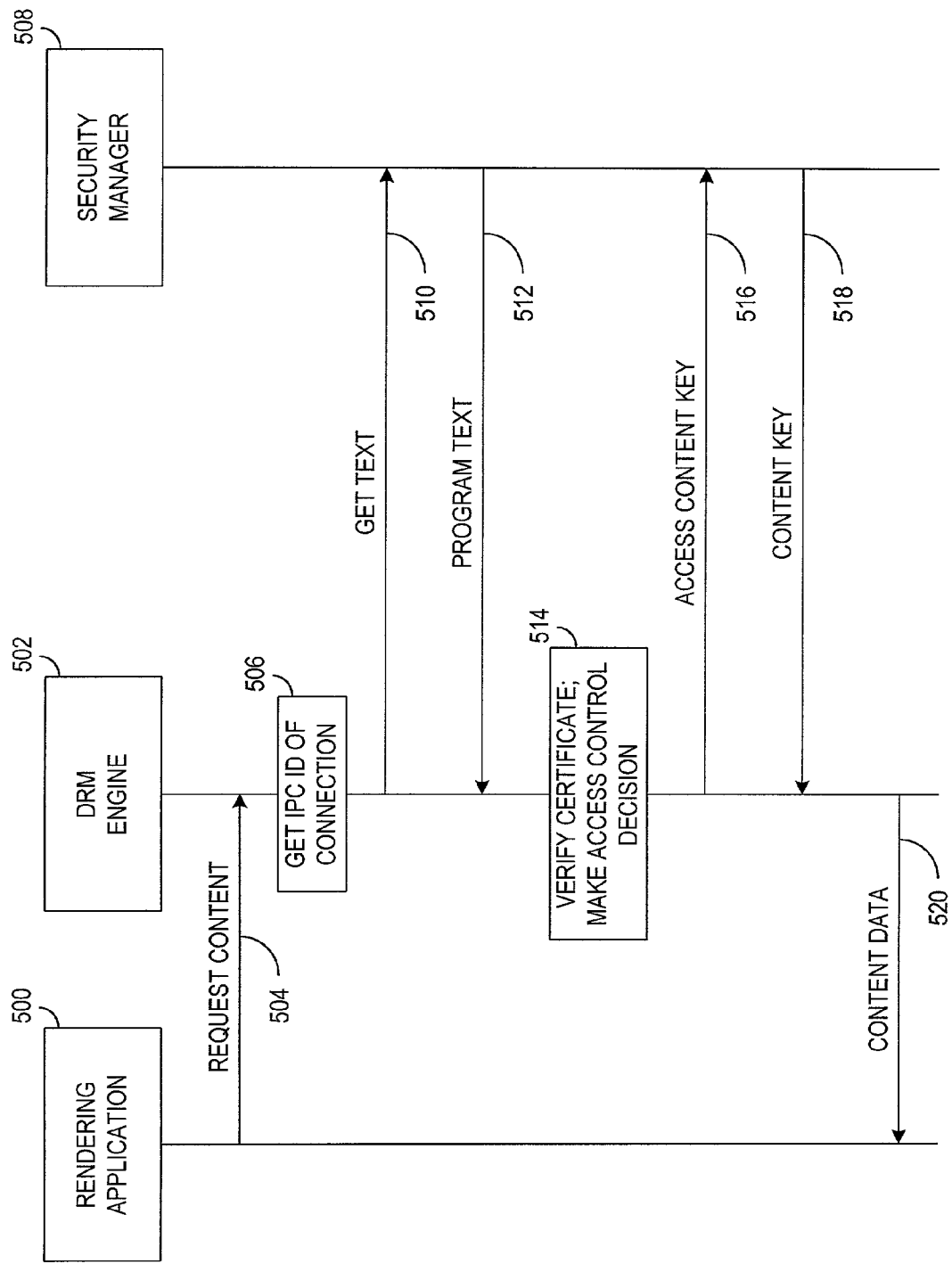
FIG. 5 illustrates an exemplary messaging sequence for enforcing digital rights management (DRM) rules, even where the rendering application is already operating, using a security manager in accordance with the present invention.

FIG. 5 illustrates an exemplary messaging sequence for enforcing digital rights management (DRM) rules, even where the rendering application is already operating, using a security manager in accordance with the present invention. In the illustrated embodiment, the rendering application 500 makes a request for content to the DRM engine 502, as depicted by the request content line 504. For example, the rendering application 500 may invoke a requestContent(contentId, pid, certificate) primitive, where the contentId represents an identifier of the content. The request is also accompanied by the certificate which certifies the code of the rendering application as compliant, and optionally a process identifier pid.

From the DRM engine's 502 point of view, the request arrives via an IPC instance "IPCId." In one embodiment of the invention, the IPC is implemented in the form of a local "socket." As is known in the art, a socket is a software object through which a program can send and receive messages by writing/reading data to/from the socket. Other IPC methodologies may also be implemented in accordance with the present invention. While in some embodiments the DRM engine may be part of the OS, in one embodiment of the invention the DRM engine 502 is not part of the OS in order to keep modifications to the OS to a minimum. The DRM engine 502 may not know whether the process identifier pid actually belongs to the initiator of the connection.

When the request arrives via the IPC instance, the DRM engine 502 obtains the IPC identifier (IPCId) of the connection as depicted by function 506. Using this information, the DRM engine 502 invokes a primitive on the security manager 508 API, as depicted by line 510. For example, the DRM engine 502 may invoke a getText(pid, IPCId) primitive on the security manager API, providing as arguments IPCId, and pid if the process identifier was provided in the request 504. Using the IPCId, the security manager 508 can identify the process at the other end of the IPC connection. If the pid was specified, the security manager 508 verifies that this process is in fact involved in IPCId. The security manager 508 verifies that, according to file systems and other access control restrictions, the DRM engine 502 is allowed to have access to the program text of this process. If so, the security manager 508 can locate the program text of this process, and return it as illustrated on line 512.

The DRM engine 502 may invoke primitives other than the getText( ) primitive on the security manager API to authenticate the rendering application/process. For example, another embodiment of the invention involves invoking a "get Hash" primitive, such as getHash( ). This request causes the security manager to compute the hash, and to return a hash of the program text of one or more constituent parts of the process. While this is similar to the getText( ) embodiment described above, there are trade-offs. For example, authentication by getting the program text of one or more constituent parts of the process from the security manager may be less efficient, but the security manager complexity is lower. On the other hand, authentication by getting the hash is more efficient, but requires that the security manager compute the hash. Implementation decisions of these (and other) alternate embodiments may be based on, for example, a sliding scale of efficiency versus the amount of modification to the operating system that can be accepted. A gethash( ) embodiment is further described in connection with FIG. 9.

The DRM engine 502 can verify the certificate based on the received program text, as depicted by function block 514. Based on the certificate and local policy settings, the DRM engine 502 can also make access control decisions. If the decision is positive, the DRM engine 502 understands that it can provide the requested content to the rendering application 500 through, for example, the same IPC connection from which the request arrived. In accordance with one embodiment of the invention, this is accomplished by the DRM engine 502 invoking a function, such as a privateRead( ) function depicted on line 516, to access the content key via the security manager 508. The security manager 508 provides the content key as illustrated by line 518. Using the content key, the DRM engine 502 can decrypt the encrypted content file, and send the resulting plaintext content back through the IPC connection as depicted by line 520.

It should be noted that applications, such as rendering application 500 or other terminal application, may include several different parts. For example, an application may include a main program loaded from one file, and one or more dynamic link library (DLL) files, device drivers, etc. loaded from other files. A DLL is a collection of one or more small programs, any of which can be called when needed by the terminal application that is running on the mobile terminal. In accordance with one embodiment of the present invention, authentication of such an application involves verifying multiple text segments, hashes, etc., depending on the authentication embodiment that is implemented. For example, in the context of the getText( ) and getHash( ) implementations described above, the returned text or hash from the security manager will include a set of objects rather than a single object. The verification of certificates may therefore involve verification based on multiple returned objects.

Figure 6:
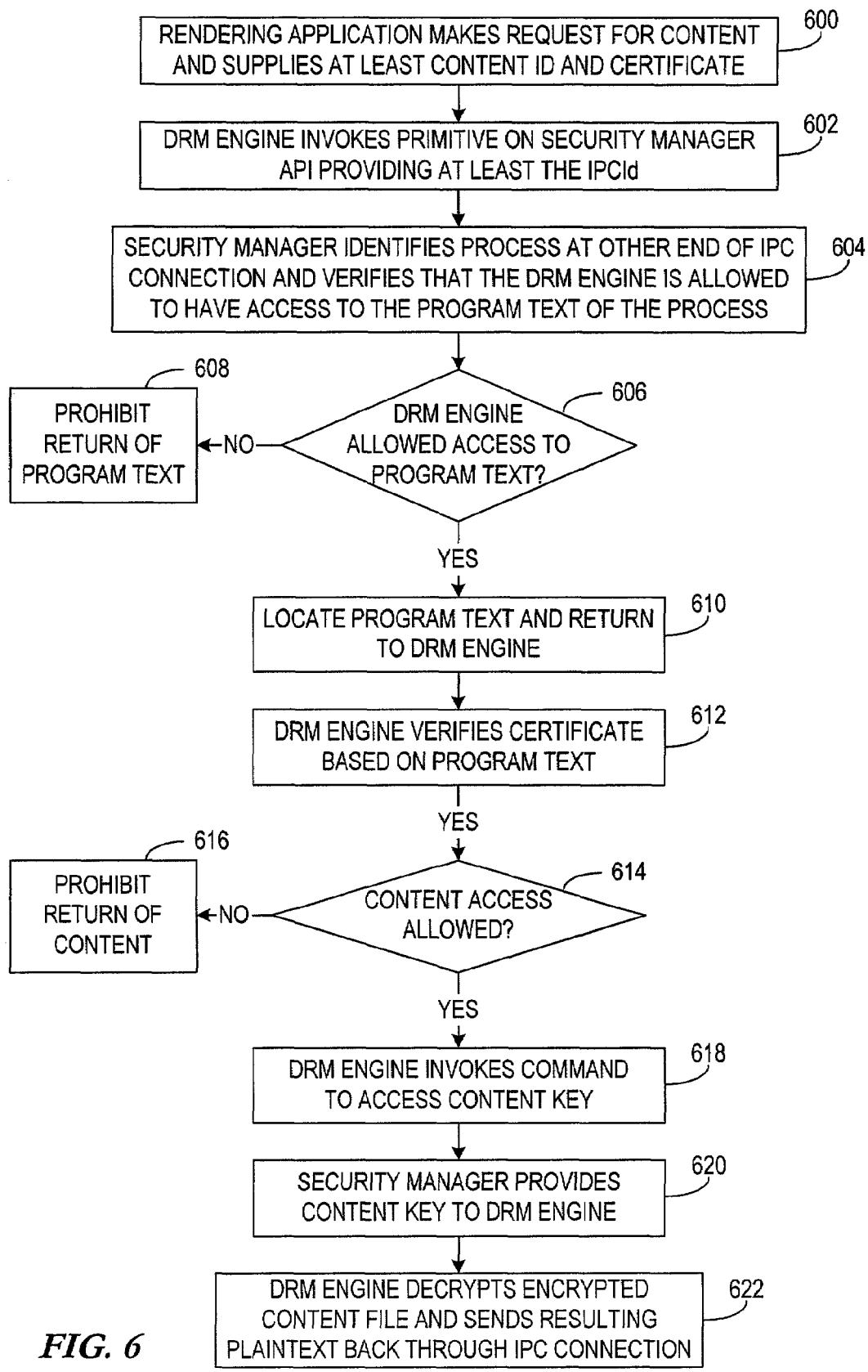
FIG. 6 is a flow diagram illustrating an exemplary method of enforcing DRM rules in accordance with the present invention.

FIG. 6 is a flow diagram illustrating an exemplary method of enforcing DRM rules in accordance with the present invention. The embodiment of FIG. 6 illustrates an example in which DRM rules are enforced, even where the rendering application is already operating, using a security manager in accordance with the present invention. The rendering application makes a request for the desired content, as shown at block 600. In one embodiment of the invention, this content request is accompanied by at least a content identification and a certificate issued by an appropriate authority. In such an embodiment, the request can have the form of: requestContent(contentId, certificate). In another embodiment of the invention, the content request is also accompanied by a process identifier pid. In such an embodiment, the request can have the form of: requestContent(contentId, pid, certificate). The particular order in which the arguments (e.g., contentId, pid, certificate) are provided is not relevant to the present invention, as any desired order may be selected.

From the DRM engine's point of view, the request comes via an IPC instance, such as an IPC instance IPCId. The DRM engine invokes 602 a primitive on the security manager API providing at least the IPCId. In one embodiment of the invention, this primitive may take the form of getText(IPCId), or getText (pid, IPCId) where a process identifier pid was provided with the content request. As previously noted, the DRM engine may invoke 602 other primitives other than a getText( ) primitive to authenticate the process. For example, the DRM engine may invoke a "get Hash" primitive, such as described below in connection with FIG. 9. For purposes of this example, however, an embodiment utilizing a getText( ) primitive is described.

As shown at block 604, the security manager identifies the process at the other end of the IPC connection, and if a process identifier pid was specified, then the security manager verifies that this process is in fact involved in ICPId. As further depicted at block 604, the security manager verifies that the DRM engine is allowed to have access to the program text of the process. It is determined 606 whether the DRM engine is allowed access to the program text, and if not, the return of the program text is prohibited 608. Otherwise, if it is determined 606 that the DRM engine is allowed to access the program text, the program text is located and returned to the DRM engine as shown at block 610.

Based on the received program text, the DRM engine verifies 612 the certificate. Further, based on the certificate and local policy settings, the DRM engine can make the access control decision. For example, if the DRM engine determines 614 that content access is not allowed, return of the content will be prohibited 616. Otherwise, if the DRM engine determines 614 that content access is allowed, the DRM engine will invoke a command to access a content key, as depicted at block 618. In one embodiment of the invention, such a command can take the form of, for example, a privateRead(contentKeyFile) command, where the argument contentKeyFile allows the security manager to access the content key from the security manager. The security manager provides 620 the content key back to the DRM engine, which in turn decrypts the encrypted content file and sends the resulting plaintext back through the IPC connection as shown at block 622.

A variety of alternative embodiments to that described in connection with FIGS. 5 and 6 are available in accordance with the principles of the present invention. Alternate embodiments of varying degrees of complexity and relying on various degrees of support from the security manager are also available in accordance with the present invention. For example, in accordance with one embodiment of the invention, it is desired to keep the security manager as simple as possible, in order to minimize changes required to the operating system. FIGS. 5 and 6 present embodiments in which the security manager may be kept relatively simple, particularly when obtaining the program text to authenticate the application/process. The description provided in connection with FIGS. 5 and 6 also make reference to an embodiment where a hash of the program text is obtained to authenticate the application/process, which thus requires that the security manager compute the hash. While authentication by obtaining only the program text of one or more constituent parts of the process from the security manager may be less efficient, the security manager can remain less complex. On the other hand, authentication by obtaining the hash is more efficient, but requires that the security manager compute the hash. In other embodiments, various degrees of reliance may be placed on the operating system/security manager, depending on the efficiency desired and the willingness to increase the complexity of the security manager. A number of representative alternative embodiments are set forth below.

Figure 7:
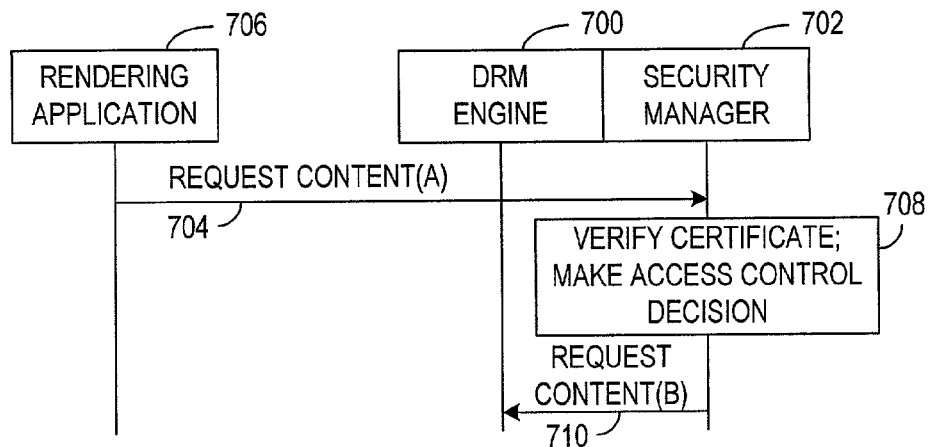
FIGS. 7-14 illustrate various representative alternative embodiments of messaging sequence segments used in connection with the enforcement of DRM rules using a security manager in accordance with the present invention.

In accordance with one alternative embodiment, the request content functionality, such as the requestContent( ) functionality described in connection with FIGS. 5 and 6, can be provided by the security manager itself. Such an embodiment is illustrated in FIG. 7. In such a case, the DRM engine 700 may be implemented as an internal module that is accessible only to the security manager 702. The security manager 702 receives a request content primitive, shown on line 704 as request content(A) request, from the rendering application 706. An example of the request content(A) primitive is requestContent(contentId, pid, certificate), which includes the certificate. The security manager 702 will verify the certificate and make access control decisions as shown at block 708, and forward a revised request content request to the DRM engine 700. For example, the revised request content, shown on line 710 as request content(B), does not include the certificate since it was verified by the security manager. An example of the request content(B) on line 710 is requestContent(contentId, pid). This embodiment would impose a greater level of responsibility on the security manager.

Figure 8:
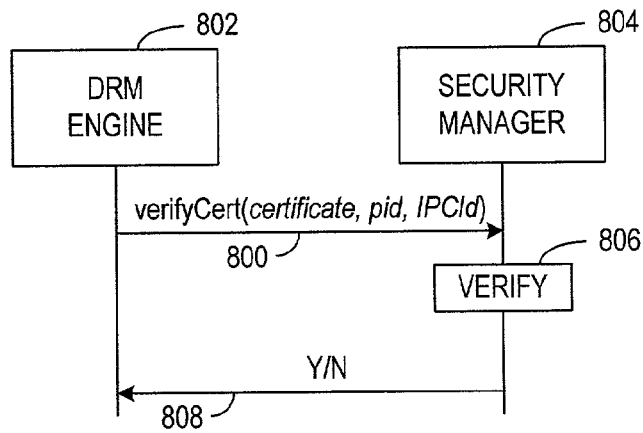

In accordance with another alternative embodiment, the "get text" functionality, implemented in the examples of FIGS. 5 and 6 using the getText( ) primitive, may be implemented in various manners. For example, referring to FIG. 8, a primitive such as a verifyCert( ) primitive shown on line 800 may be used rather than a getText( ) primitive. The verify Cert( ) primitive 800 issued from the DRM engine 802 will accept the certificate, the IPCId, and optionally the pid (e.g., verifyCert(certificate, pid, IPCId)). The security manager 804 will verify 806 the certificate and return a response indicating whether the certificate has been verified, as depicted on line 808. In this embodiment, the security manager 804 accepts more responsibility for directly verifying the certificate, rather than providing the program text to the DRM engine to perform such a task.

As previously described, terminal applications may include several different parts, such as a main program loaded from one file and one or more other device drivers, DLL files, etc. loaded from other files. Authentication of such a multi-part application in the context of the embodiment of FIG. 8 involves verifying multiple certificates. For example, the verifyCert( ) primitive would input a set of certificates rather than a single certificate, e.g., verifyCert(certificate-1 . . . , certificate-n, pid, IPCId). The verification 806 would then verify each certificate, and provide the appropriate responses via path 808.

Figure 9:
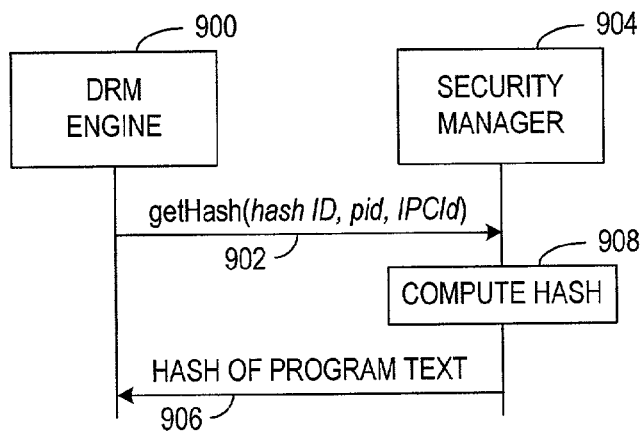

In accordance with another alternative embodiment illustrated in FIG. 9, the "get text" functionality may be implemented, for example, by the DRM engine 900 issuing a primitive such as a getHash( ) primitive shown on line 902. Such a primitive can include a hash function identifier (hash ID) and IPCId as arguments to take a form such as getHash(hash ID, IPCId). The security manager 904 acts on this primitive provided by the DRM engine 900, and, as depicted by line 906, returns the hash 908 of the program text of the process communicating with the DRM engine via IPCId. In an embodiment where the security manager may be implemented in the OS kernel, the security manager can compute the hash of the program text whenever a new process is created and return the computed hash value when the getHash( ) primitive is invoked. In order to accomplish this, the security manager 904 needs to know the type of hash to compute at the time of process creation, which can be determined in a number of ways including encoding the hash function type or the certificate itself in the program file, or by using a standard naming convention for certificate files that allows the certificate files to be located easily. It should also be recognized that in the case where the rendering/terminal application includes several parts (e.g., a main program plus DLLs), authentication may involve verifying multiple hashes, where a set of objects rather than a single object would be returned via path 906.

In accordance with the present invention, the security manager may be implemented inside the OS kernel or outside the OS kernel as a secure library. For example, in the Linux OS, implementation of the security manager may correspond to modifying the kernel or making a root-owned library function. If modifying the kernel, this approach is secure if the kernel is not further modifiable. If making a root-owned library function, some additional protections may be provided, such as disallowing Linux OS root privileges to the owner of the device.

Figure 10:
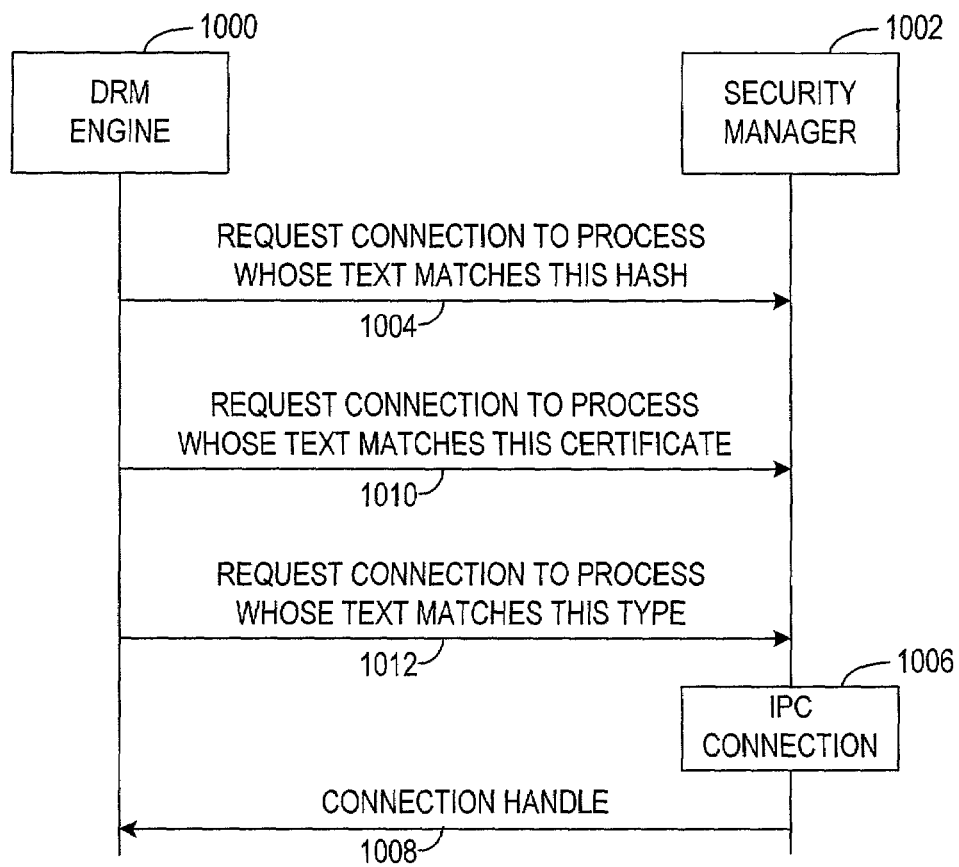

In accordance with another alternative embodiment shown in FIG. 10, the DRM engine 1000 can request the security manager 1002 to provide a connection to a process whose text matches a particular hash, rather than having the DRM engine 1000 specify a particular IPC connection. Such a request is illustrated on line 1004. If a process whose text matches the particular hash is already running, the security module 1002 may create an IPC connection to it as shown at block 1006, and return a handle to the connection to the DRM engine 1000 as depicted by line 1008. In this case, the initial request content primitive discussed in connection with FIGS. 5 and 6, e.g., requestContent (contentId, pid, certificate), is not required. As a further variation, rather than the DRM engine 1000 requesting the security manager 1002 to provide a connection to a process whose text matches a particular hash, the DRM engine can specify the certificate itself as depicted by line 1010. Yet another variation involves the DRM engine 1000 specifying a "type" as depicted on line 1012, such as a "certified audio application," or other type selected from a standard set of type names that are specified in certificates.

Figure 11:
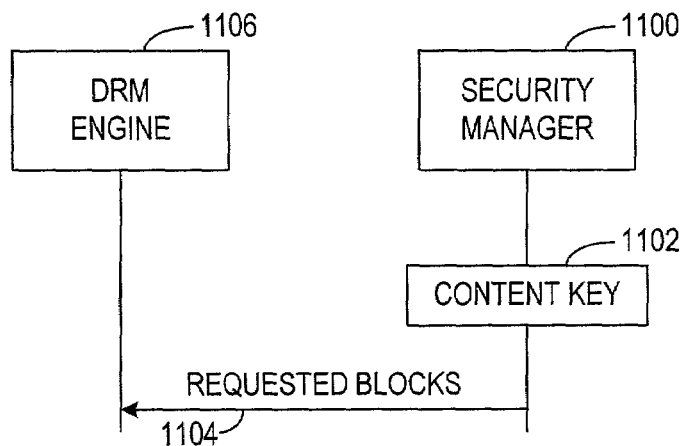
Figure 12:
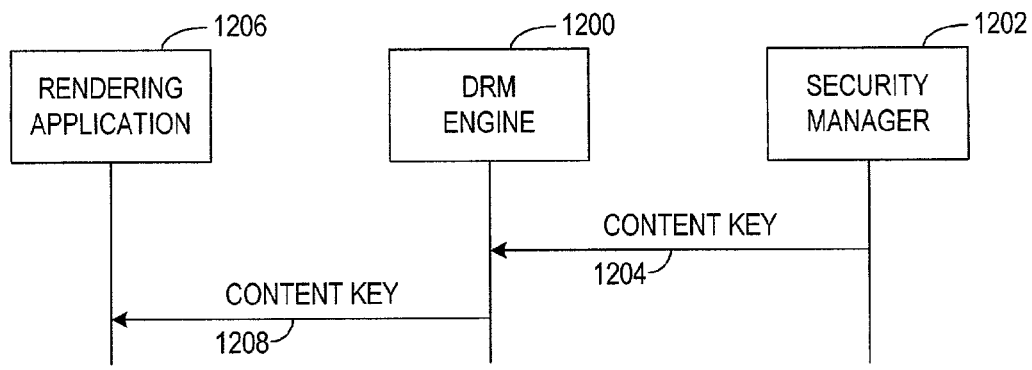
Figure 13:
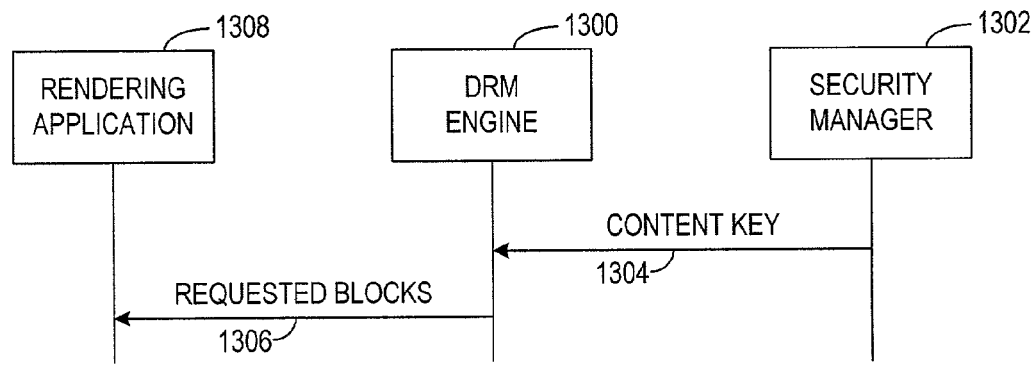

Other alternative embodiments involve the manner of accessing the content key from the security manager. In the embodiments of FIGS. 5 and 6, a primitive is invoked to access the content key, such as the privateRead(contentKeyFile) primitive. However, this can be implemented in a variety of ways. For example, the content can be stored in an encrypted format, and the key may be provided to the DRM engine when it opens a private file, such as described in connection with FIG. 5. Alternatively, as shown in FIG. 11, the security manager/kernel 1100 can keep the key 1102 itself, or protect the data by some other means, and give out only the requested blocks as illustrated by line 1104 to the DRM engine 1106. In another alternative embodiment shown in FIG. 12, the DRM engine 1200 receives the content key from the security manager 1202 as depicted on line 1204, and in turn the DRM engine 1200 may provide the content key to the rendering application 1206 as illustrated by line 1208. In such an embodiment, the DRM engine 1200 provides the content key to the rendering application 1206 rather than having the DRM engine 1200 decrypt the encrypted content file and send the resulting plaintext to the rendering application 1206. In yet another embodiment shown in FIG. 13, the DRM engine 1300 again receives the content key from the security manager 1302 as depicted on line 1304. In this embodiment, the DRM engine 1300 may only provide requested blocks of data depicted on line 1306 to the rendering application 1308 once the DRM engine 1300 has received the content key. As can be seen, a variety of analogous embodiments for securing the content delivery may be implemented in accordance with the principles of the present invention.

Figure 14:
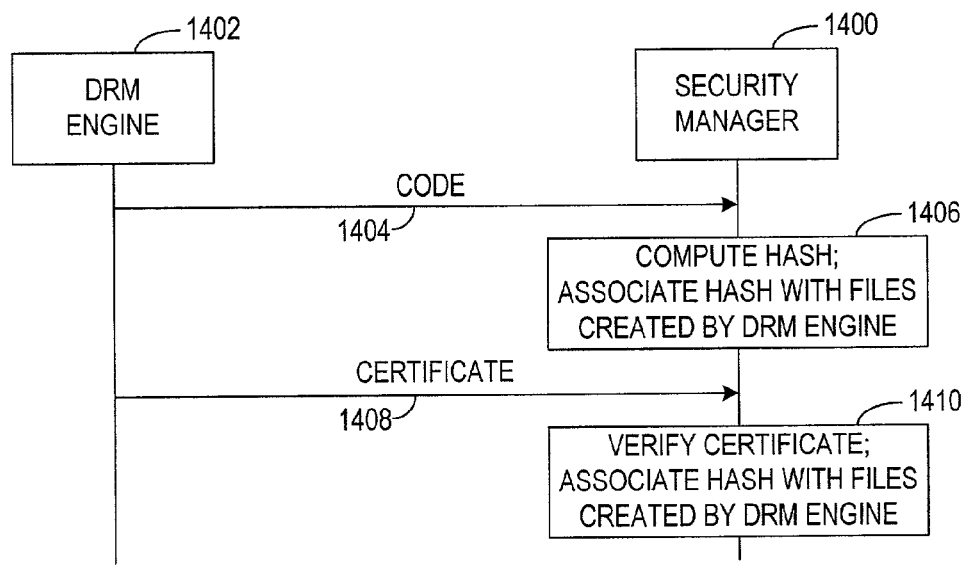

In another alternative embodiment illustrated in FIG. 14, the security manager 1400 may verify the DRM engine 1402. This verification may be accomplished by computing the hash of the DRM engine's code provided via path 1404, and associating the hash with the private files created by it as illustrated at block 1406. This will ensure that only the same DRM engine 1402 can gain access to the private files. Alternatively, the security manager can verify the DRM engine's 1402 certificate provided via path 1408, and can associate the certificate with the private files as depicted by block 1410. This would allow a new version of the DRM engine 1402 to be able to gain access to files created by a prior version.

Figure 15:
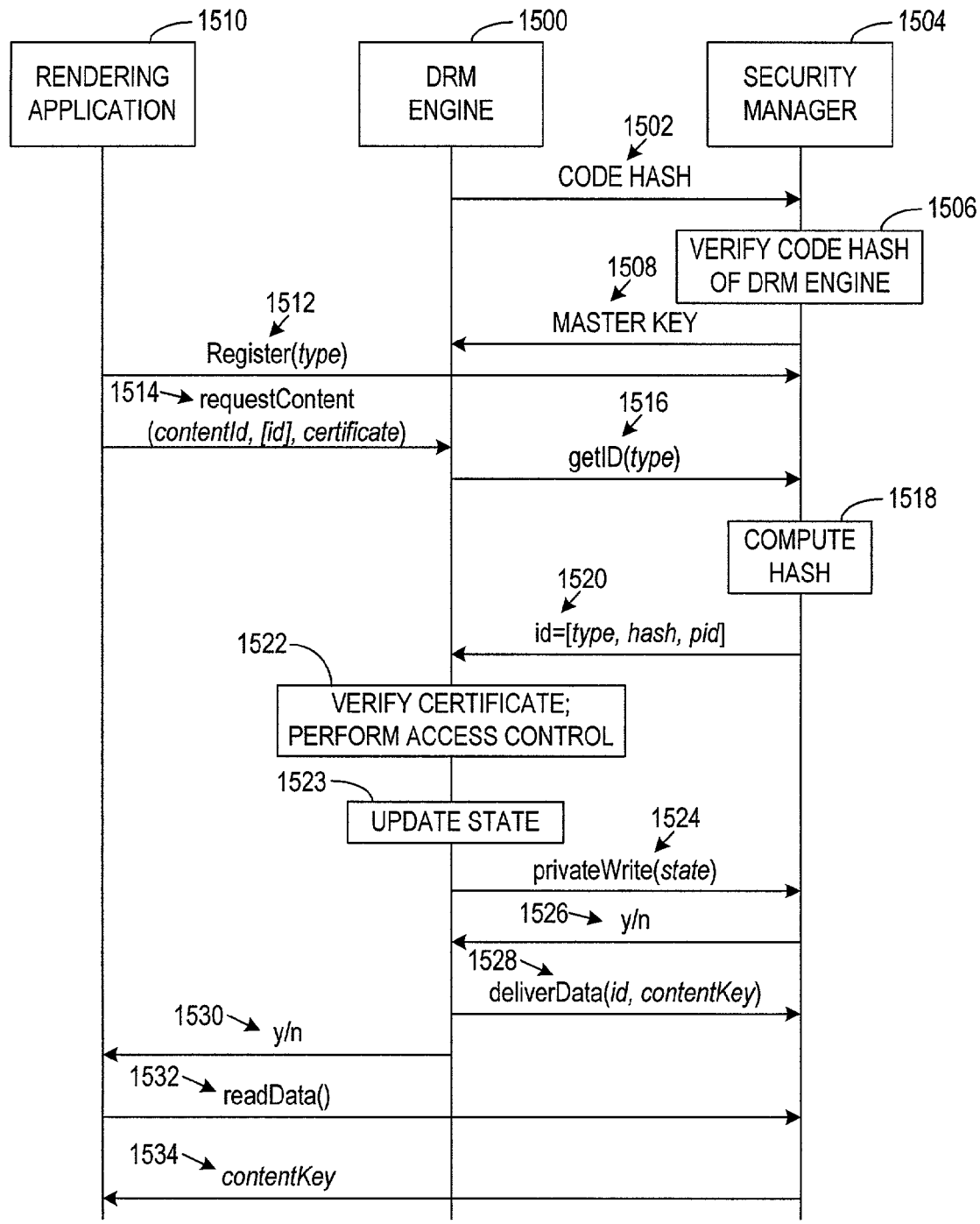
FIG. 15 illustrates another exemplary messaging sequence for enforcing DRM rules, even where the rendering application is already operating, using a security manager in accordance with the present invention.

FIG. 15 illustrates another exemplary messaging sequence for enforcing DRM rules, even where the rendering application is already operating, using a security manager in accordance with the present invention. The embodiment of FIG. 15 illustrates how different techniques, such as those described in connection with FIGS. 10 and 14 and other techniques, can be aggregated in a particular scenario. The illustrated embodiment of FIG. 15 differs from the embodiment described in connection with FIG. 5, for example, as the embodiment of FIG. 15 relies more heavily on the security manager. Such an embodiment may provide additional security, but at the cost of greater complexity to the changes required of the general purpose operating system. As previously indicated, varying degrees of modifications to the OS kernel to provide different levels of security may be implemented in accordance with the present invention. For example, in one embodiment of the invention, the OS kernel is modified to provide functions such as a manner of identifying other processes, a naming scheme to support such identification process, a query mechanism by which processes may identify each other, identification of the DRM process, and a secure communication channel between processes. FIG. 15 illustrates some of these functions.

In the illustrated embodiment, the DRM process is first identified. This is accomplished by having the DRM engine 1500 provide information such as a code hash 1502 to the security manager 1504. The security manager 1504 verifies the code hash of the DRM engine, as illustrated at block 1506, and returns a master key 1508. In this manner, the security manager 1504 can verify the DRM engine 1500, analogous to the embodiment described in connection with FIG. 14.

The next step is to identify other processes to facilitate inter-process authentication. Before a rendering application 1510 makes a request for content, it registers 1512 a name or other identifier with the kernel. A naming scheme is provided to support the identification process, and such a resulting name may be, for example, "audio" or other "type" as previously described. The "type" may be kept, for example, in a resolve table maintained within the kernel. When the rendering application 1510 makes a request for content, such as via a requestContent( ) primitive 1514, it provides information such as the content ID, certificate, and an ID such as the type in this example. In turn, the DRM engine 1500 invokes a getID(type) primitive 1516 as part of the inter-process authentication, essentially requesting an ID of a process with a known type. The security manager 1504 computes a hash 1518, and returns an ID 1520 including, for example, the type, hash, and a process identifier. Based on this information, the DRM engine 1500 verifies the certificate and performs the access control as shown at block 1522.

The DRM engine may update its state information each time the rendering application is authorized successfully. For example, the user may have the right to use the content a fixed number of times. The number of uses is part of the state information, and the integrity of this state information should be assured. In particular, the user should not be able to modify the state information, or replay a past state. In one embodiment of the invention, the state information needs to be stored persistently, which requires secure storage with integrity-protection. The DRM engine 1500 will update its own state as illustrated at block 1523, and will write this updated state to a secure persistent storage with integrity protection by invoking a primitive, such as the privateWrite(state) primitive 1524, and receive a response 1526 from the security manager 1504. When the DRM engine 1500 starts up the next time (e.g., after a reboot), it will read the state information from persistent storage (not shown) via the security manager 1504. The security manager 1504 will ensure the integrity of the stored information.

The DRM engine 1500 can then issue a deliverData(id, contentKey) primitive 1528 to the security manager 1504, and notify 1530 the rendering application 1510 whether it is authorized to access the content. Where the rendering application 1510 is authorized, a readData( ) primitive 1532 can be issued from the rendering application 1510 to the security manager 1504, and in response the security manager 1504 provides the content key 1534 to the rendering application 1510. After obtaining the content key, the rendering application 1510 can decrypt the content, assuming that the rendering application has been authorized access to the encrypted content file. Alternatively, as described in connection with FIG. 13, the DRM engine 1500 may receive the content key and provide only the requested blocks of the content file. Still other alternative embodiments can be used in connection with the messaging sequence shown in FIG. 15, such as one or more of those set forth in FIGS. 7-14.

Figure 16:
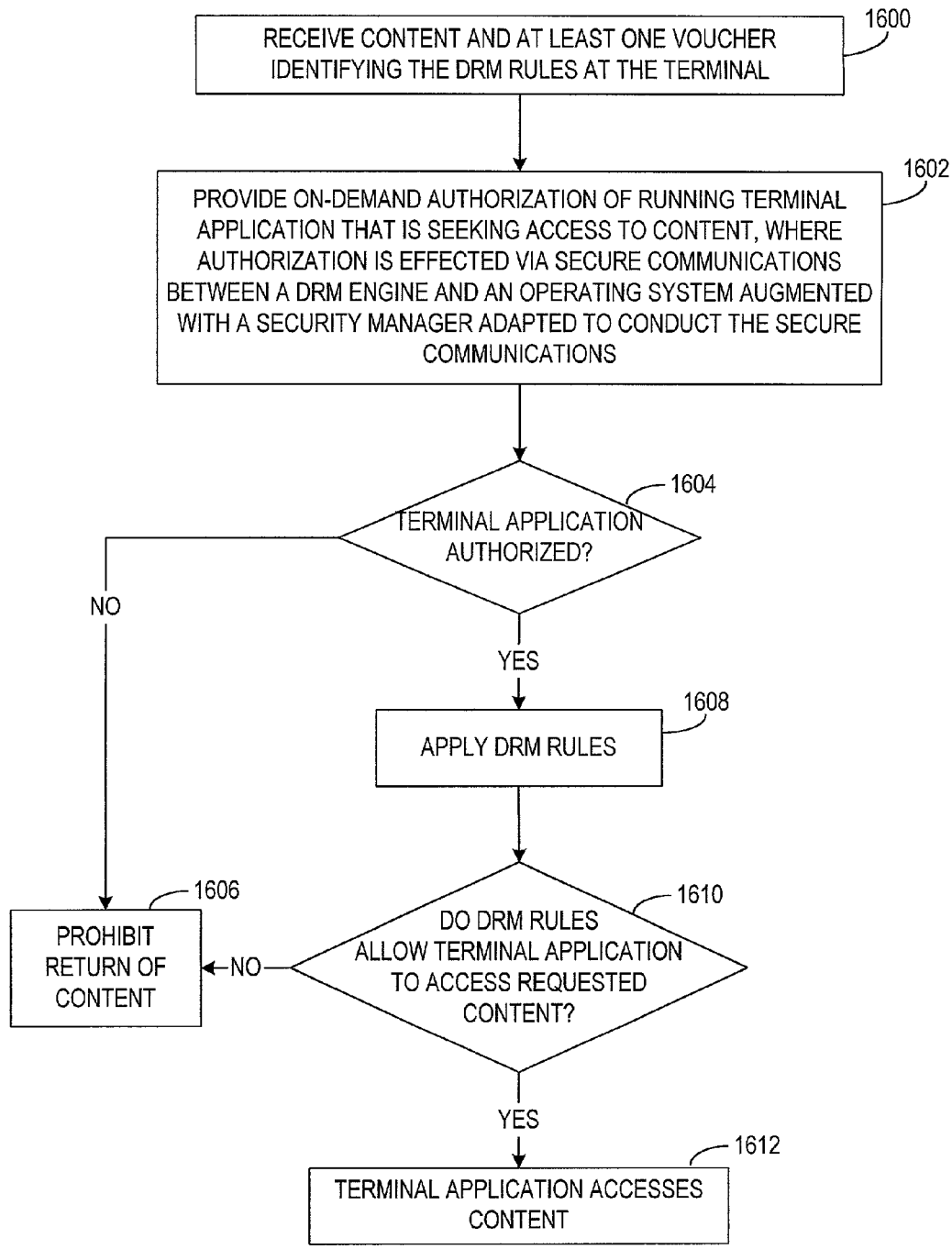
FIG. 16 is a flow diagram illustrating an exemplary method of enforcing DRM rules in accordance with another more general embodiment of the invention.

FIG. 16 is a flow diagram illustrating an exemplary method of enforcing DRM rules in accordance with another more general embodiment of the invention. In accordance with the illustrated embodiment, content and at least one voucher identifying the DRM rules is received 1600 at the terminal. As shown at block 1602, on-demand authorization is provided for an application currently operating on the terminal (e.g., a rendering application) where that application is seeking access to the received content. In one embodiment of the invention, the content that is received is securely stored at the terminal, and the terminal application seeks to obtain access to the securely stored content. This authorization is effected via secure communications between the DRM engine and the operating system that has been augmented with the security manager.

If it is determined 1604 that the terminal application has not been authorized, the content will not be returned for use by the terminal application as illustrated at block 1606. If the terminal application is authorized, the DRM rules are applied 1608. It is then determined 1610 whether the DRM rules allow the authorized terminal application to access the requested content. If not, the content will not be returned for use by the terminal application as illustrated at block 1606. Otherwise, the terminal application will obtain access 1612 to the content.

The present invention is applicable to any open-platform devices, such as Symbian-based, Linux-based, etc. devices. It should be recognized that while the present invention is described above in connection with wireless devices, the present invention is also applicable in the server environment or other landline environments. Thus, while the description above focuses on DRM applications on wireless terminals to facilitate an understanding of the invention, those skilled in the art will recognize from the foregoing description that the principles of the present invention are applicable in other environments.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using, or selling the invention.

Memory devices include, but are not limited to, hard disk drives, diskettes, optical disks, magnetic tape, semiconductor memories such as RAM, ROM, PROMS, etc. Transmitting devices include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

From the description provided herein, those skilled in the art are readily able to combine software created as described with appropriate general purpose or special purpose computer hardware to create a computer system and/or computer subcomponents embodying the invention, and to create a computer system and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A processor-implemented method comprising:
   receiving content and at least one voucher identifying digital rights management (DRM) rules at a terminal that provides on-demand authentication of an operating terminal application which is seeking access to the content via secure communications between a DRM engine and an operating system augmented with a security manager adapted to conduct the secure communications, wherein the terminal application comprises a rendering program running on the operating system concurrently with and independently of the DRM engine, and wherein the terminal application is already running prior to being authenticated;
   issuing a request to the security manager by the DRM engine to provide a connection to a process whose program text matches a hash provided by the DRM engine, wherein the process corresponds to the terminal application;
   returning a handle to the connection to the DRM engine;
   invoking an authentication request at the DRM engine to retrieve at least a portion of program text of the process identified by the handle;
   receiving the authentication request by the security manager and identifying the process corresponding to the connection;
   providing the portion of program text to the DRM engine from the security manager;
   verifying, by the DRM engine, the legitimacy of the terminal application by verifying a certificate of the terminal application based on the program text;
   if the terminal application is authenticated, applying the DRM rules to determine whether the terminal application may access the content; and
   accessing the content by the terminal application if access is allowed in response to applying the DRM rules.

2. The method of claim 1, wherein providing on-demand authentication of the operating terminal application comprises:
   invoking a certificate verification request at the DRM engine, wherein the certificate verification request is accompanied by arguments including a certificate of the terminal application and an identifier of a process corresponding to an inter-process communication (IPC) connection opened by the terminal application in response to a content request by the terminal application, wherein the process corresponds to the terminal application;
   receiving the certificate verification request by the security manager and verifying the certificate against a predetermined certificate value; and
   providing a verification indication to the DRM engine from the security manager indicating whether the certificate is correct and valid.

3. The method of claim 1, wherein providing on-demand authentication of the operating terminal application comprises:
   invoking an authentication request at the DRM engine to retrieve a hash of at least a portion of program text of a process identified by an inter-process communication (IPC) connection opened by the terminal application in response to a content request by the terminal application, wherein the process corresponds to the terminal application;
   receiving the authentication request by the security manager and identifying the process corresponding to the IPC connection;
   computing, at the security manager, the hash of the program text for each new process created;
   providing, from the security manager to the DRM engine, the hash of the program text corresponding to the IPC connection identified in the authentication request; and
   verifying, by the DRM engine, the legitimacy of the terminal application by comparing the hash of the program text with values expected by the DRM engine based on the certificate issued to the terminal application.

4. The method of claim 1, wherein receiving content comprises receiving encrypted content, and wherein accessing the content by the terminal application comprises accessing plaintext content resulting from decrypting the encrypted content at the DRM engine.

5. The method of claim 4, further comprising requesting a content key from the security manager by the DRM engine, and wherein decrypting the encrypted content at the DRM engine comprises decrypting the encrypted content using the content key received from the security manager.

6. The method of claim 1, wherein receiving content comprises receiving encrypted content, and wherein accessing the content by the terminal application comprises:
   maintaining a content key at the security manager;
   decrypting requested blocks of the content at the security manager using the content key; and
   providing the requested blocks of decrypted content to the DRM engine.

7. The method of claim 1, wherein receiving content comprises receiving encrypted content, and wherein accessing the content by the terminal application comprises:
- requesting a content key from the security manager by the DRM engine;
- decrypting requested blocks of the content at the DRM engine using the content key; and
- providing only requested blocks of the content to the terminal application.

8. The method of claim 1, wherein receiving content comprises receiving encrypted content, and wherein accessing the content by the terminal application comprises:
- providing a content key from the security manager to the terminal application; and
- decrypting the encrypted content by the terminal application using the content key.

9. The method of claim 1, wherein receiving content comprises receiving encrypted content, and wherein accessing the content by the terminal application comprises:
- providing a content key from the DRM engine to the terminal application; and decrypting the encrypted content by the terminal application using the content key.

10. The method of claim 1, further comprising:
- issuing a request to the security manager by the DRM engine to provide a connection to a process whose program text matches a terminal application certificate provided by the DRM engine, wherein the program text corresponds to the terminal application; and
- returning a handle to the connection to the DRM engine.

11. The method of claim 10, wherein providing on-demand authentication of the operating terminal application comprises:
- invoking an authentication request at the DRM engine to retrieve at least a portion of program text of the process identified by the handle;
- receiving the authentication request by the security manager and identifying the process corresponding to the connection;
- providing the program text to the DRM engine from the security manager; and
- verifying, by the DRM engine, the legitimacy of the terminal application by verifying a certificate of the terminal application based on the program text.

12. The method of claim 1, further comprising:
- issuing a request to the security manager by the DRM engine to provide a connection to a process whose program text matches a particular type selected from a standard set of type specified in certificates; and
- returning a handle to the connection to the DRM engine.

13. The method of claim 1, further comprising verifying the DRM engine by the security manager by computing a hash of the DRM engine's code and associating the hash with private files created by the DRM engine.

14. The method of claim 1, further comprising verifying the DRM engine by the security manager by verifying the DRM engine's certificate and associating the certificate with private files created by the DRM engine.

15. The method of claim 1, further comprising:
- wirelessly providing the content and a voucher identifying the DRM rights to the terminal; and
- securely storing the content and the voucher locally at the terminal.

16. The method of claim 1, wherein the terminal is a wireless terminal, and further comprising sending the content and the at least one voucher to the wireless terminal from a second wireless terminal.

17. The method of claim 1, wherein applying the DRM rules comprises analyzing usage rights provided via the voucher.

18. The method of claim 1, wherein the terminal application is a multi-part terminal application, and wherein providing on-demand authentication of the terminal application comprises providing on-demand authentication of each part of the multi-part terminal application.

19. The method of claim 1, wherein the terminal application is a multi-part terminal application, and wherein providing on-demand authentication of the multi-part terminal application comprises:
- invoking an authentication request at the DRM engine to retrieve program text of each part of the multi-part terminal application identified by an inter-process communication (IPC) connection opened in response to a content request by the multi-part terminal application;
- receiving the authentication request by the security manager and identifying the process corresponding to the IPC connection;
- returning the program text of each part of the multi-part terminal application to the DRM engine from the security manager; and
- verifying, by the DRM engine, the legitimacy of the multi-part terminal application by verifying certificates of the terminal application based on each of the returned program texts.

20. The method of claim 1, wherein the terminal application is a multi-part terminal application, and wherein providing on-demand authentication of the multi-part terminal application comprises:
- invoking an authentication request at the DRM engine to retrieve hashes of program text of each part of the multi-part terminal application identified by an inter-process communication (IPC) connection opened in response to a content request by the multi-part terminal application;
- receiving the authentication request by the security manager and identifying the process corresponding to the IPC connection;
- computing, at the security manager, a hash for each of the program texts for each new process created;
- returning the hash of each part of the multi-part terminal application to the DRM engine from the security manager; and
- verifying, by the DRM engine, the legitimacy of the multi-part terminal application by verifying certificates of the terminal application based on each of the returned hashes.

21. The method of claim 1, wherein the terminal application is a multi-part terminal application, and wherein providing on-demand authentication of the multi-part terminal application comprises:
- invoking a certificate verification request at the DRM engine, wherein the certificate verification request is accompanied by arguments including a certificate for each part of the multi-part terminal application and an identifier of a process corresponding to an inter-process communication (IPC) connection opened in response to a content request by the terminal application;
- receiving the certificate verification request by the security manager and verifying the certificates against predetermined certificate values; and
- providing a verification indication to the DRM engine from the security manager indicating whether the certificates are correct and valid.

22. A processor-implemented method comprising:
- requesting, by a rendering application, access to content securely stored in a terminal by invoking a content request accompanied by at least a content identifier that identifies the requested content, a certificate of the rendering application, and a process identifier corresponding to the rendering application;
- requesting, by a digital rights management (DRM) engine, at least a portion of program text of a process identified by an inter-process communication (IPC) connection between the DRM engine and the rendering application, wherein the process corresponds to the rendering application, wherein the request for the portion of program text includes the process identifier together with an identifier of the IPC connection, and wherein the rendering application comprises a program running on an operating system concurrently with and independently of the DRM engine;
- receiving the request for the program text by a security manager and identifying the process corresponding to the IPC connection;
- providing the program text to the DRM engine from the security manager;
- verifying, by the security manager, that the process identified by the process identifier is associated with the process identified by the IPC connection identifier;
- authenticating the rendering application based on the program text of the process and the certificate of the rendering application, wherein the rendering application is already operating prior to the authentication of the application;
- making an access control decision by the DRM engine if the rendering application is authorized to access the program text of the process;
- making the content accessible to the rendering application if the access control decision is positive; and
- wherein requesting access to the content comprises authenticating the rendering application by the security manager using a rendering application certificate and forwarding a content request from the security manager to the DRM engine if the rendering application is successfully authenticated.

23. The method of claim 22, wherein the requested content stored in the terminal is encrypted, and further comprising:
- requesting, by the DRM engine, a content key for decrypting the requested content if the access control decision is positive;
- providing the content key to the DRM engine from the security manager; and
- decrypting the content at the DRM engine.

24. The method of claim 23, wherein authorizing the content comprises authorizing the decrypted content to be accessed via the IPC connection by the rendering application.

25. The method of claim 22, wherein making the content accessible to the rendering application comprises authorizing the content to be accessed by the rendering application via the IPC connection.

26. The method of claim 22, further comprising augmenting an operating system operating within the terminal to include the security manager.

27. The method of claim 22, wherein requesting the program text comprises invoking a primitive to obtain the program text, wherein the primitive is accompanied by arguments including an IPC identifier to allow the security manager to identify the process corresponding to the IPC connection.

28. An apparatus comprising:
- a rendering application to provide a content request and to present content received via the apparatus upon access authorization;
- a digital rights management (DRM) engine coupled to receive the content request and to invoke a request to authenticate the rendering application in response thereto, wherein the request to authenticate the rendering application includes at least an identifier of an inter-process communication (IPC) connection opened in response to the content request;
- an operating system augmented with a security manager configured to receive the request to authenticate the rendering application and the IPC connection identifier, and in response to provide data uniquely associated with a process identified by the IPC connection, wherein the process corresponds to the rendering application, wherein the data uniquely associated with the process identified by the IPC connection comprises a hash of the program text of the process; and
- wherein the DRM engine further receives the data and verifies a certificate of the rendering application using the data, and if the rendering application is successfully verified, allowing the rendering application access to the content as dictated by usage rights of a corresponding voucher received via the apparatus, wherein the rendering application comprises a program running on the operating system concurrently with and independently of the DRM engine, and wherein the rendering application is already running prior to being authenticated by the security manager.

29. The apparatus as in claim 28, wherein the content received at the terminal is encrypted, and wherein the security manager is further configured to provide a content key to the DRM engine in response to a key request by the DRM engine.

30. The apparatus as in claim 29, wherein the DRM engine is further configured to decrypt the content using the content key, and to allow the rendering application access to the decrypted content as dictated by the usage rights.

31. The apparatus as in claim 28, wherein the security manager is integrally implemented into the operating system kernel.

32. The apparatus as in claim 28, wherein the security manager is implemented outside the operating system kernel as a secure library.

33. The apparatus as in claim 28, wherein the apparatus comprises a mobile device comprising at least one of a wireless telephone, wireless PDA, or wireless computing device.

34. The apparatus as in claim 28, wherein the apparatus comprises a landline client terminal coupled in a server environment.

* * * * *